US011724448B2

United States Patent
Huang et al.

(10) Patent No.: US 11,724,448 B2
(45) Date of Patent: Aug. 15, 2023

(54) DISGUISING COLOR IN 3D OBJECT FORMATION

(71) Applicant: Hewlett-Packard Development Company, L.P., Spring, TX (US)

(72) Inventors: Wei Huang, Palo Alto, CA (US); Steven J. Simske, Ft. Collins, CO (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 16/612,000

(22) PCT Filed: Jul. 17, 2017

(86) PCT No.: PCT/US2017/042335
§ 371 (c)(1),
(2) Date: Nov. 8, 2019

(87) PCT Pub. No.: WO2019/017869
PCT Pub. Date: Jan. 24, 2019

(65) Prior Publication Data
US 2020/0164571 A1 May 28, 2020

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 30/00* (2014.12); *B33Y 70/00* (2014.12); *B29C 64/393* (2017.08); *B33Y 50/02* (2014.12)

(58) Field of Classification Search
CPC ................ B29C 64/106; B29C 64/165; B29C 64/209; B29C 64/112; B29C 64/124; B29C 64/135
See application file for complete search history.

(56) References Cited

U.S. PATENT DOCUMENTS 6,305,923 B1 * 10/2001 Godwin .............. B29C 45/2737
425/572
6,357,799 B1  3/2002 Shibata et al.
(Continued)

FOREIGN PATENT DOCUMENTS

RU    2014151617      7/2016
WO    WO-2005017048   2/2005
(Continued)

OTHER PUBLICATIONS 3d-printing and Electronic Packaging—Current Status and Future Challenges, downloaded on 06/22/20217, http://www.engineering.com/3DPrinting/3DPrintingArticles/ArticleID/12724/Rize-Arises-with-.

*Primary Examiner* — Joseph S Del Sole
*Assistant Examiner* — Margaret B Hayes
(74) *Attorney, Agent, or Firm* — Shook, Hardy & Bacon L.L.P.

(57) ABSTRACT

A device comprising a material distributor and a fluid dispenser. The material distributor to distribute a build material, layer-by-layer, to form a 3D object. A fluid dispenser to selectively dispense in at least some of the respective layers a first fluid agent and a second fluid agent. The first fluid agent, comprising a first color, is to be dispensed at first selectable voxel locations to affect a first material property of a first portion of the 3D object. The second fluid agent, comprising a second color, is to be dispensed at (Continued)

second selectable voxel locations to at least partially disguise the first color of the first portion of the 3D object.

13 Claims, 8 Drawing Sheets

(51) Int. Cl.
  *B33Y 30/00* (2015.01)
  *B33Y 70/00* (2020.01)
  *B33Y 50/02* (2015.01)
  *B29C 64/393* (2017.01)

(56) References Cited

U.S. PATENT DOCUMENTS

| | | | |
|---|---|---|---|
| 6,652,256 | B2 | 11/2003 | Coe |
| 7,357,887 | B2 | 4/2008 | May |
| 7,456,983 | B2 | 11/2008 | Meador et al. |
| 8,062,737 | B2 | 11/2011 | Abrams et al. |
| RE45,762 | E | 10/2015 | Raksha et al. |
| 2010/0191360 | A1 | 7/2010 | Napadensky et al. |
| 2014/0277661 | A1* | 9/2014 | Amadio ............. G05B 19/4099 700/119 |
| 2016/0151980 | A1* | 6/2016 | Hatanaka ........... H04N 1/00827 700/98 |
| 2016/0346840 | A1 | 12/2016 | Clark et al. |
| 2017/0087772 | A1* | 3/2017 | Hakkaku ............. B29C 37/0025 |
| 2017/0157828 | A1* | 6/2017 | Mandel ................ B29C 48/21 |
| 2017/0157831 | A1* | 6/2017 | Mandel ................ B29C 64/106 |
| 2017/0203504 | A1* | 7/2017 | Johnson ............... B29C 64/112 |
| 2018/0050488 | A1* | 2/2018 | Okawa ................. B29C 64/393 |
| 2018/0111311 | A1* | 4/2018 | Ochi ..................... B33Y 30/00 |
| 2018/0133980 | A1* | 5/2018 | Mantell ................ B29C 64/209 |
| 2018/0178444 | A1* | 6/2018 | Hakkaku ................ B41J 2/01 |
| 2021/0229341 | A1* | 7/2021 | Arai ..................... B29C 64/112 |

FOREIGN PATENT DOCUMENTS

| | | | |
|---|---|---|---|
| WO | WO-2015153764 | 10/2015 | |
| WO | WO-2016022449 | 2/2016 | |
| WO | WO-2016068899 | 5/2016 | |
| WO | WO-2016068899 A1 * | 5/2016 | ............ B33Y 30/00 |

\* cited by examiner

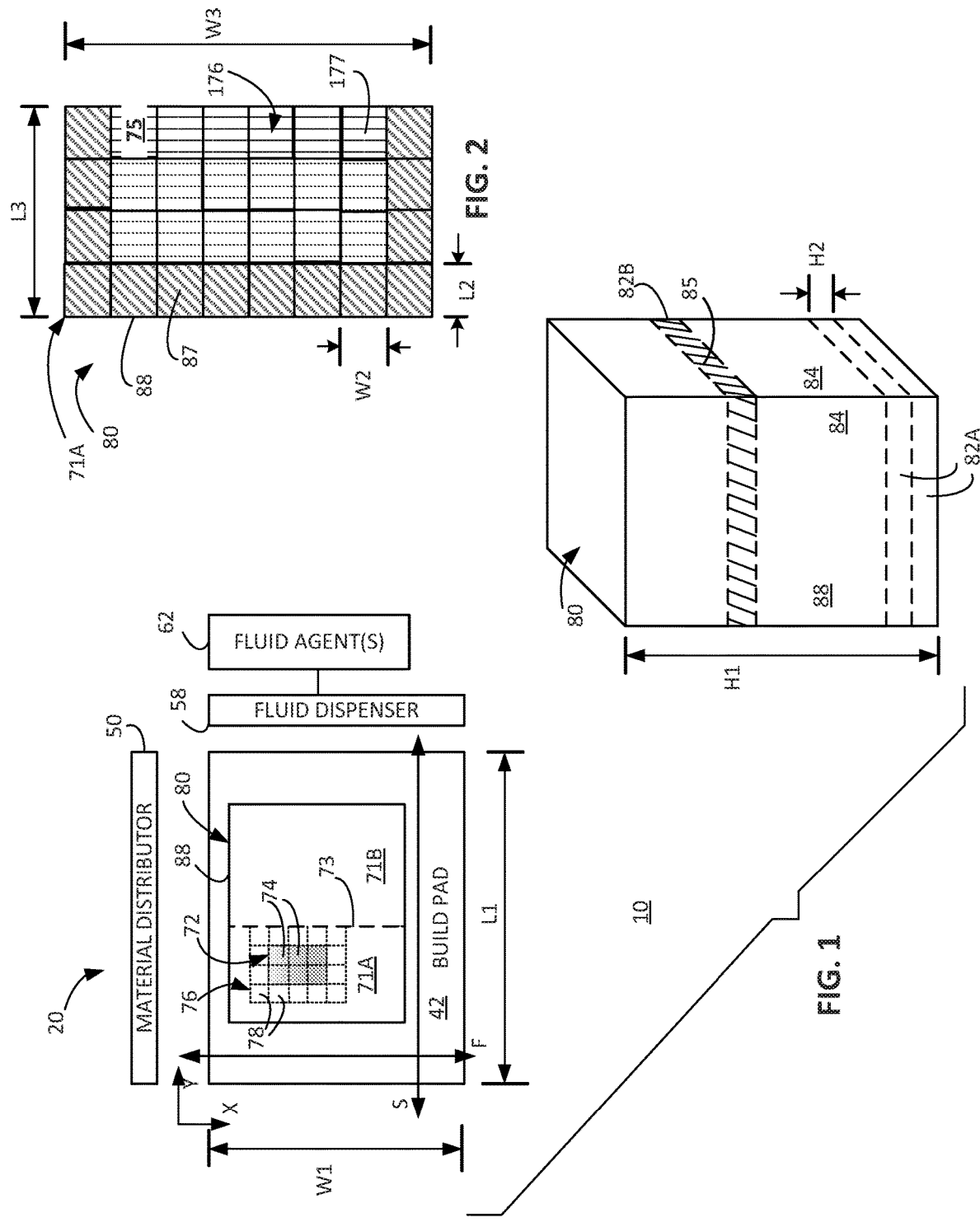

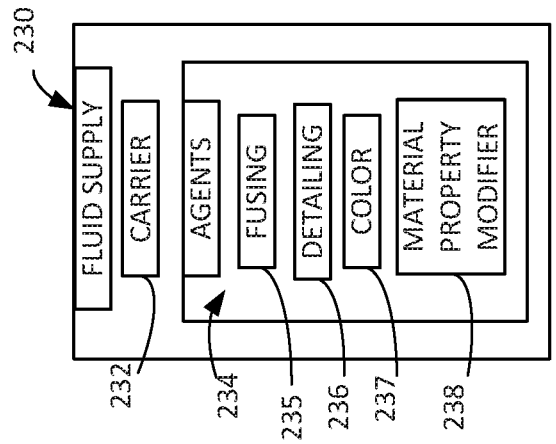
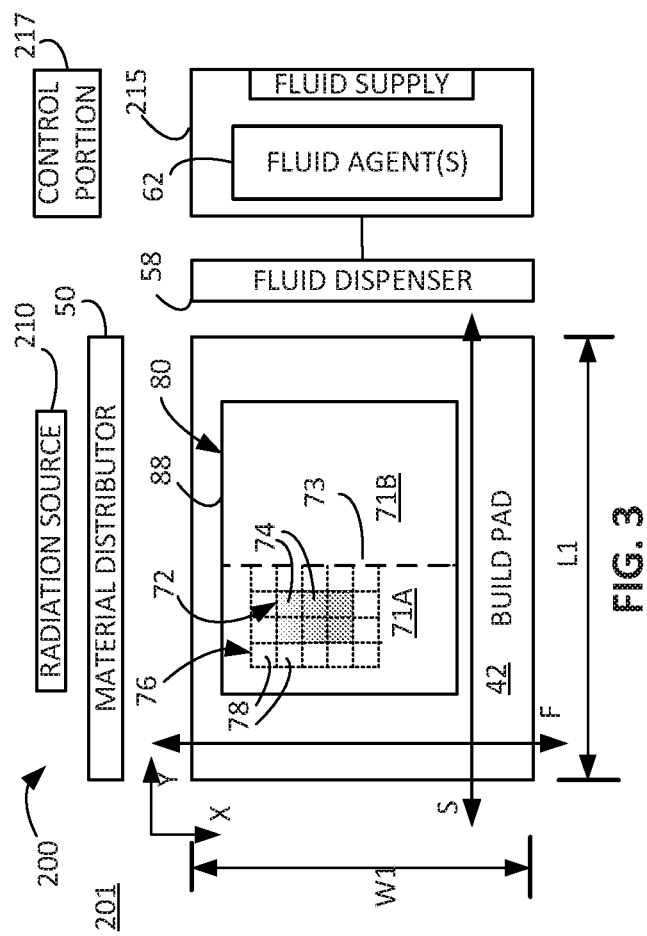

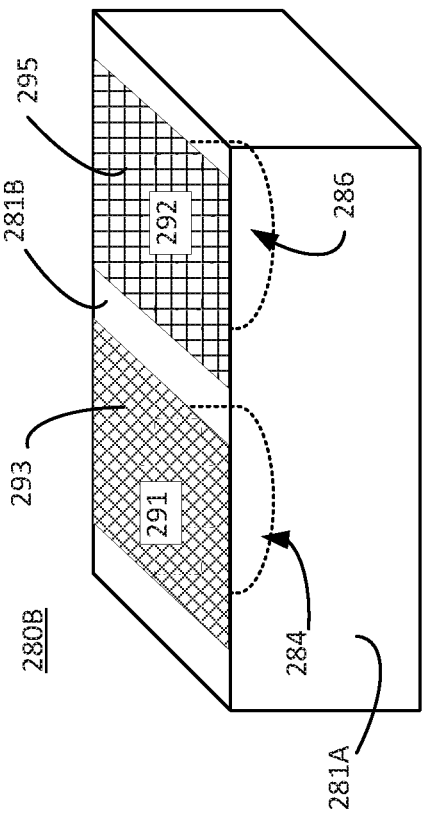
FIG. 6B
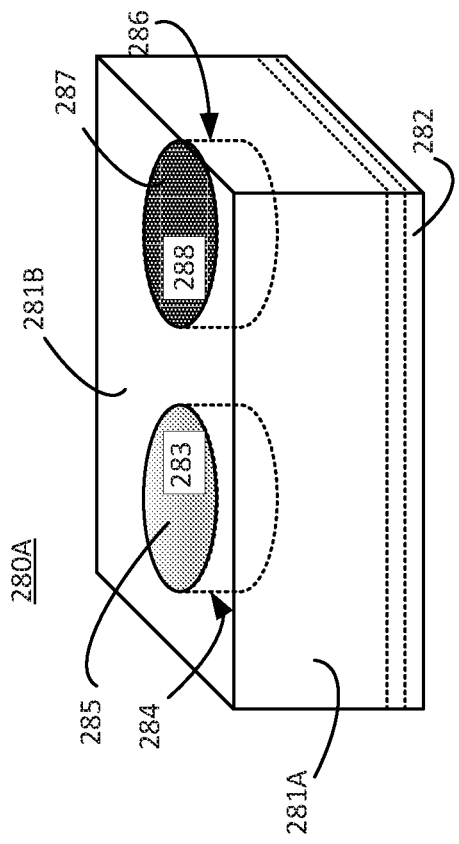
FIG. 6A
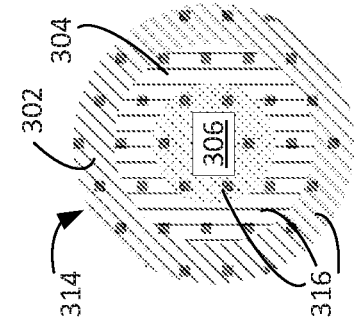
FIG. 7C
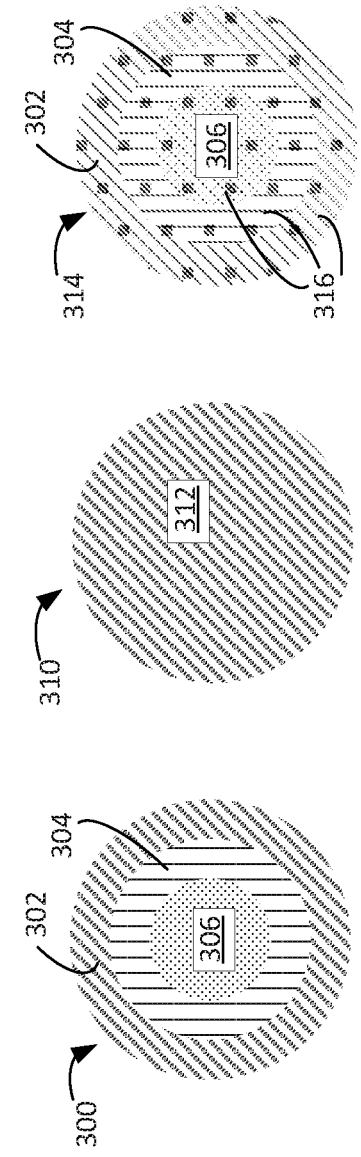
FIG. 7B
FIG. 7A

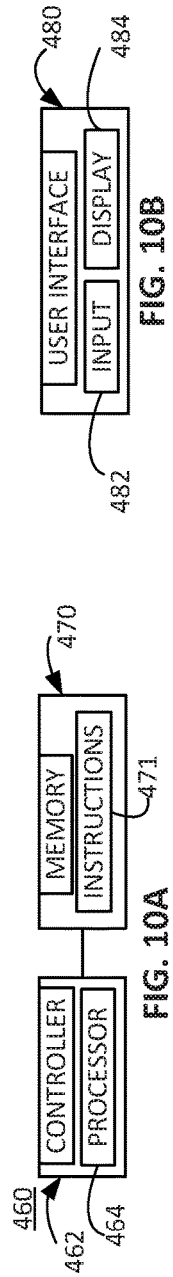
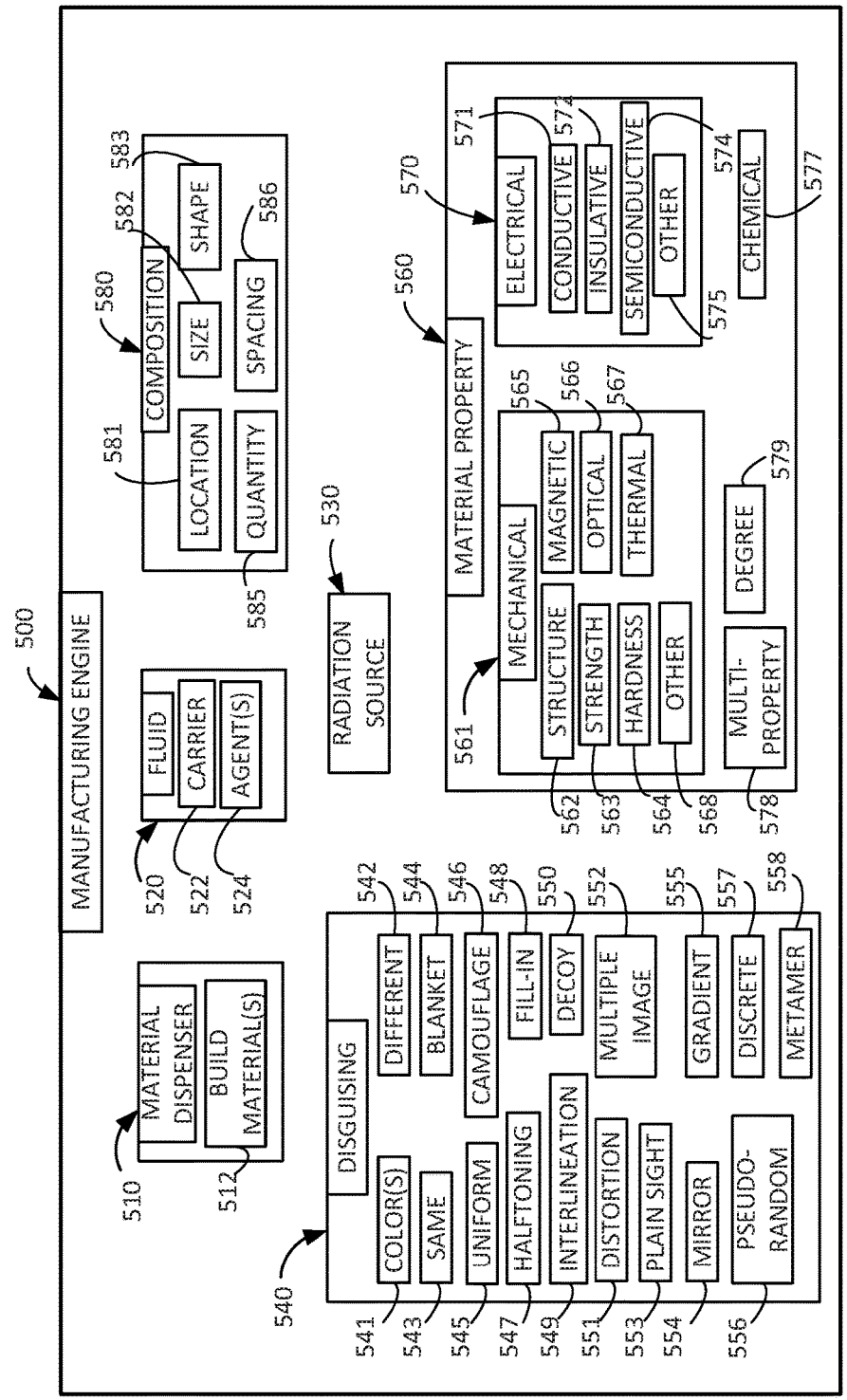

DISGUISING COLOR IN 3D OBJECT FORMATION

BACKGROUND

Additive manufacturing may revolutionize design and manufacturing in producing three-dimensional (3D) objects. Some forms of additive manufacturing may sometimes be referred to as 3D printing. Some additively manufactured 3D objects may have functional and/or aesthetic characteristics.

BRIEF DESCRIPTION OF THE DRAWINGS

FIG. 1 is a block diagram schematically representing an example device to additively manufacture 3D objects.

FIG. 2 is a top plan view schematically representing a portion of one layer of an example 3D object.

FIG. 3 is a block diagram schematically representing an example device to additively manufacture 3D objects.

FIG. 4 is a block diagram schematically representing an example fluid supply.

FIG. 5 is a block diagram schematically representing an example color map.

FIG. 6A is an isometric view schematically representing an exposed layer of an example at least partially formed 3D object.

FIG. 6B is an isometric view schematically representing some example disguising color patterns on the exposed layer of the example at least partially formed 3D object of FIG. 6A.

FIG. 7A is a top plan view schematically representing an exposed layer of an example at least partially formed 3D object.

FIG. 7B is a top plan view schematically representing an example disguising color pattern on the exposed layer of the example at least partially formed 3D object of FIG. 7A.

FIG. 7C is a top plan view schematically representing an exposed layer of an example at least partially formed 3D object, including an applied fusing agent.

FIGS. 10A and 10B are each a block diagram schematically representing an example control portion and a user interface, respectively.

FIG. 11 is a block diagram schematically representing an example manufacturing engine.

DETAILED DESCRIPTION

Figure 8A:
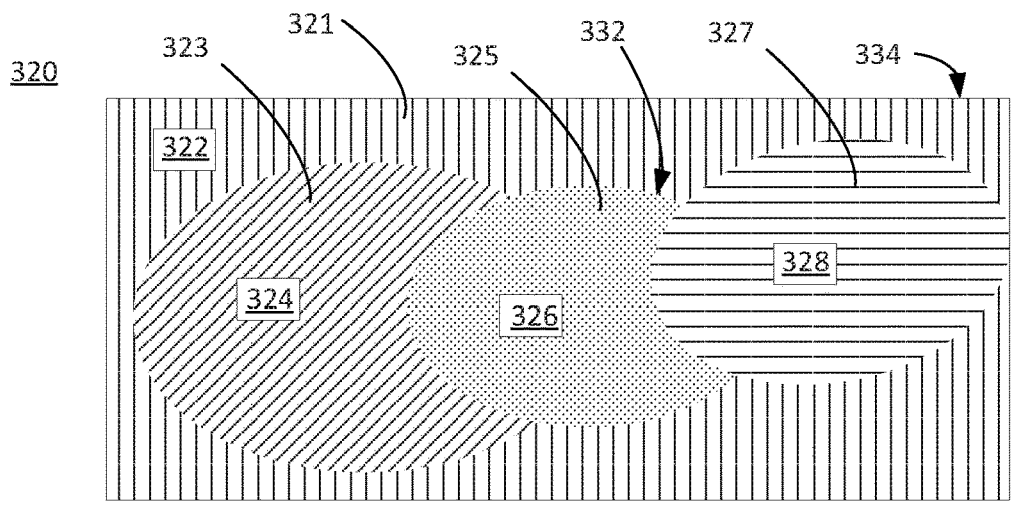
FIG. 8A is a top plan view schematically representing an exposed layer of an example at least partially formed 3D object.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to hindering a viewer's comprehension of some features of a 3D object during its formation without affecting the intended material properties of the 3D object. By doing so, one may protect confidential information regarding a purpose, function, operation, identification, security, materials, structure, manufacture, effect, etc. of the 3D object generally and/or of at least some layers of the 3D object. In some non-limiting examples, such confidential information may include trade secret information, security information (e.g. public key), identification information (e.g. personal medical implant), and/or design/manufacturing information (e.g. military, industrial, etc.).

In some examples, a device comprises a material distributor and a fluid dispenser. The material distributor is to distribute a build material, layer-by-layer, to form a 3D object. The fluid dispenser is to selectively dispense in at least some of the respective layers a first fluid agent and a second fluid agent. The first fluid agent, comprising a first color, is dispensed at first selectable voxel locations to affect a first material property of a first portion of the 3D object. The second fluid agent, comprising a second color, is dispensed at second selectable voxel locations to at least partially disguise the first color of the first portion of the 3D object.

In some examples, at least some of the second selectable voxel locations may correspond to (e.g. be at least partially co-located) at least some of the first selectable voxel locations. In some examples, at least some of the second selectable voxel locations may be different than at least some of the first selectable voxel locations.

In some examples, the application of the second fluid agent may result in portions of at least some layers of the 3D object under formation (or fully formed) exhibiting a second material property which is different than the first material property.

In some examples, the first material property comprises at least one of a mechanical property, an electrical property, and a chemical property or even other types of selectable material properties.

In some examples, the first color may be intrinsic to a first material property associated with the first fluid agent. In some examples, the first color comprises a color intrinsic to the first material property associated with a material modifying agent of the first fluid agent, which is applied without an additional dye or colorant. In some examples, the first color comprises a color intrinsic to the first material property associated with a material modifying agent of the first fluid agent and an added dye or colorant comprising part of the first fluid agent.

In some examples, the second color may be the same color as the first color. In some examples, the first fluid agent comprises a dye or colorant such that the applied second color of a color disguising pattern may more easily correspond to (e.g. be substantially similar to, match, etc.) the first color.

However, in some examples, the second color may be different than the first color. For instance, a saturation, intensity, density, or chroma may be differ by some selectable percentage. In some instances, the difference in color may be more significant, such as the first color may fall within one wavelength range (e.g. blue) while the second color may fall within another wavelength range (e.g. yellow). In some such instances, the significant difference in color may sometimes be referred to as being substantially different. In some instances, selecting whether a color difference (between the second color and the first color) is to be subtle or dramatic may depend on the size, shape, and distribution of the first color to be disguised, or whether a complex disguising pattern (e.g. camouflage) is being employed.

In some examples, at least some of the second voxel locations do not form part of the 3D object. Instead, such selectable second voxel locations are formed as part of layers of build material, which will be discarded after complete formation of 3D object. However, in some such examples, the application of the second color at such discardable second voxel locations may help to disguise a size, shape, and/or distribution of first color during formation of various layers of 3D object.

In some examples, at least some second selectable voxel locations, which at least partially define a disguising color pattern, may be formed solely of a build material without application of a disguising color fluid agent. In some such examples, an intrinsic color of the build material may act as part of the disguising color pattern.

In some examples, the first portion may comprise a part or region of an entire 3D object. In some such examples, the other or remaining portions of 3D object may sometimes be referred to as second portions, third portions, etc. In some examples, the disguising color/pattern may be applied solely to the first portion. In some examples, the disguising pattern applied to at least two different portions (e.g. first, second, etc.) of the 3D object.

In some examples, a disguising color pattern may be applied and/or formed in at least one layer to comprise at least one part of an external surface of the fully formed 3D object. In some examples, such an external disguising color pattern may be implemented in addition to any internal disguising patterns (those implemented in some layers during formation of the 3D object). However, in some examples, such an external disguising pattern may be implemented without any internal disguising patterns.

In some examples, a disguising color pattern (e.g. of the second color) may be constant from layer to layer, whether or not there are changes in size, shape, distribution of first color from layer to layer.

However, in some examples, a disguising color pattern may change from layer-to-layer. For instance, a first disguising color pattern may be applied on, or to, one layer, and then a second different disguising color pattern may be applied on or to another layer. In some examples, changes in the disguising color pattern may be based on changes in the size, shape, and/or distribution of the first color from layer to layer of the 3D object to maximize effectiveness of the disguising effect.

In some examples, more than two different disguising color patterns may be applied on different layers. In some examples, the at least two different disguising color patterns may be applied in an alternating layers or may be pseudo-randomly distributed among multiple layers.

Via such example arrangements, a first color associated with a first material property of a portion of a 3D object may be at least partially disguised during formation of the 3D object to hinder or prevent comprehension by a viewer of some information about the 3D object, such as its function, purpose, operation, identification, security, materials, manufacture, structure, effect, etc. In some examples, the disguising may take the form of a second color applied during formation of at least some layers (of the 3D object) to disguise (e.g. obfuscate, obscure, conceal, disguise, and/or disinform, etc.) a size, shape, and/or distribution of the first color. In this way, at least some examples may enable formation of a 3D object, which may be at least partially viewable or even recordable during formation, without revealing certain information about the 3D object. At least some such example arrangements may prevent reverse-engineering information regarding the 3D object. Moreover, such example arrangements may be implemented during formation of a 3D object with little or no increase in manufacturing time and at minimal cost.

These examples, and additional examples, are further described in association with at least FIGS. 1-12.

FIG. 1 is a diagram schematically representing an example device 20 to additively manufacture an example 3D object 80. In some examples, the device 20 comprises a material distributor 50 and a fluid dispenser 58.

The material distributor 50 is arranged to dispense a build material layer-by-layer onto a build pad 42 to at least partially additively form the 3D object 80. 1. Once formed, the 3D object 80 may be separated from the build pad 42. It will be understood that a 3D object of any shape and any size can be manufactured, and the object 80 depicted in FIG. 1 provides just one example shape and size of a 3D object. In some instances device 20 may sometimes be referred to as a 3D printer. Accordingly, the build pad 42 may sometimes be referred to as a print bed or a receiving surface.

It will be understood that the material distributor 50 may be implemented via a variety of electromechanical or mechanical mechanisms, such as doctor blades, slot dies, extruders, and/or other structures suitable to spread, deposit, and/or otherwise form a coating of the build material in a generally uniform layer relative to the build pad 42 or relative to a previously deposited layer of build material.

In some examples, the material distributor 50 has a length (L1) at least generally matching an entire length (L1) of the build pad 42, such that the material distributor 50 is capable of coating the entire build pad 42 with a layer 82A of build material in a single pass as the material distributor 50 travels the width (W1) of the build pad 42. In some examples, the material distributor 50 can selectively deposit layers of material in lengths and patterns less than a full length of the material distributor 50. In some examples, the material distributor 50 may coat the build pad 42 with a layer 82A of build material(s) using multiple passes instead of a single pass.

It will be further understood that a 3D object additively formed via device 20 may have a width and/or a length less than a width (W1) and/or length (L1) of the build pad 42.

In some examples, the material distributor 50 moves in a first orientation (represented by directional arrow F) while the fluid dispenser 58 moves in a second orientation (represented by directional arrow S) generally perpendicular to the first orientation. In some examples, the material distributor 50 can deposit material in each pass of a back-and-forth travel path along the first orientation while the fluid dispenser 58 can deposit fluid agents in each pass of a back-and-forth travel path along the second orientation. In at least some examples, one pass is completed by the material distributor 50, followed by a pass of the fluid dispenser 58 before a second pass of the material distributor 50 is initiated, and so on.

In some examples, the material distributor 50 and the fluid dispenser 58 can be arranged to move in the same orientation, either the first orientation (F) or the second orientation (S). In some such examples, the material distributor 50 and the fluid dispenser 58 may be supported and moved via a single carriage while in some such examples, the material distributor 50 and dispenser 58 may be supported and moved via separate, independent carriages.

In some examples, the build material used to generally form the 3D object comprises a polymer material. In some examples, the polymer material comprises a polyamide material. However, a broad range of polymer materials (or their combinations) may be employed as the build material. In some examples, the build material may comprise a ceramic material. In some examples, the build material may take the form of a powder while in some examples, the build material may take a non-powder form, such as liquid or filament. Regardless of the particular form, at least some examples of the build material is suitable for spreading, depositing, extruding, flowing, etc. in a form to produce layers (via material distributor 50) additively relative to build pad 42 and/or relative to previously formed first layers of the build material.

In some examples, the build material does not significantly exhibit at least some of the mechanical, electrical, chemical properties, etc. identified in association with at least FIG. 11. However, if desired, at least some of these various properties may be infused into the build material to at least some degree via fluid agent(s) 62 and/or a radiation source, as later described below in more detail in association with at least FIG. 1-4, and FIG. 11 Moreover, in some examples, one can select a build material which already incorporates at least some of these properties prior employing the build material in forming the 3D object.

In some examples, the fluid dispenser 58 shown in FIG. 1 comprises a printing mechanism, such as an array of printheads, each including a plurality of individually addressable nozzles for selectively ejecting fluid agents onto a layer of build material. Accordingly, in some examples, the fluid dispenser 58 may sometimes be referred to as an addressable fluid ejection array. In some examples, the fluid dispenser 58 may eject individual droplets having a volume on the order of ones of picoliters or on the order of ones of nanoliters.

In some examples, fluid dispenser 58 comprises a thermal inkjet (TIJ) array. In some examples, fluid dispenser 58 may comprise a piezoelectric inkjet (PIJ) array or other technologies such as aerosol jetting, anyone of which can precisely, selectively deposit a small volume of fluid. In some examples, fluid dispenser 58 may comprise continuous inkjet technology.

In some examples, the fluid dispenser 58 selective dispenses droplets on a voxel-by-voxel basis. In one sense a voxel may be understood as a unit of volume in a three-dimensional space. In some examples, a resolution of 1200 voxels per inch in the x-y plane is implemented via fluid dispenser 58. In some examples, a voxel may have a height H2 (or thickness) of about 100 microns, although a height of the voxel may fall between about 80 microns and about 100 microns. However, in some examples, a height of a voxel may fall outside the range of about 80 to about 100 microns.

In some examples, the fluid dispenser 58 has a width (W1) at least generally matching an entire width (W1) of the build pad 42, and therefore may sometimes be referred to as providing page-wide manufacturing (e.g. page wide printing). In such examples, via this arrangement the fluid dispenser 58 can deposit fluid agents onto the entire receiving surface in a single pass as the fluid dispenser 58 travels the length (L1) of the build pad 42. In some examples, the fluid dispenser 58 may deposit fluid agents onto a given layer of material using multiple passes instead of a single pass.

In some examples, fluid dispenser 58 may comprise, or be in fluid communication with, an array of reservoirs to contain various fluid agents 62. In some examples, the array of reservoirs may comprise a fluid supply 230, 230, as further described respectively in association with FIGS. 3-4. In some examples, at least some of the fluid agents 62 may comprise a fusing agent, a color agent, detailing agent, etc. to enhance formation of each layer 82A of build material. In particular, upon application onto the build material at selectable positions via the fluid dispenser 58, the respective fusing agent and/or detailing agent may diffuse, saturate, and/or blend into the respective layer of the build material at the selectable positions.

In some examples and as further described later throughout at least some examples of the present disclosure, the fluid dispenser 58 may deposit a first fluid agent (including a first color) to influence a material property of the to-be-formed 3D object and/or may deposit a second fluid agent as a second color to at least partially disguise the first color (its associated size, shape, and/or distribution) in at least some layers of a 3D object during formation. It will be understood that the second selectable voxel locations at which the disguising color is applied may be fully unfused, partially fused, or fully fused.

As further shown in FIG. 1, in some examples, the at least partially formed 3D object 80 comprises a first portion 71A and a second portion 71B with dashed line 73 representing a boundary between the first portion 71A and the second portion 71B.

During formation of a desired number of layers 82A of the build material, in some examples the fluid dispenser 58 may selectively dispense droplets of fluid agent(s) 62 at some first selectable voxel locations 74 of at least some respective layers 82A to at least partially define the first portion 71A of the 3D object. It will be understood that a group 72 of first selectable voxel locations 74, or multiple different groups 72 of first selectable voxel locations 74 may be selected in any position, any size, any shape, and/or combination of shapes.

In some examples, the at least some first selectable voxel locations 74 may correspond to an entire layer 82A of a 3D object or just a portion of a layer 82A. Meanwhile, in some examples, the 3D object may comprise a part of a larger object. In some examples, each first selectable voxel location 74 corresponds to a single voxel.

In some examples, as further shown in FIG. 1, during formation of a given layer 82A including first selectable voxel locations 72 (at which a first color may be exhibited), a second color (e.g. disguising color) may be applied at second selectable voxel locations 78 to at least partially disguise the first color at the first selectable voxel locations 74. In some examples, at least some of the second selectable voxel locations 78 correspond to at least some of the first selectable voxel locations. Several examples of application of a disguising color pattern relative to a first color are described later in association with at least FIGS. 6A-9D.

FIG. 2 is an enlarged partial sectional view (e.g. a horizontal slice) which provides a further illustration of a portion of the example 3D object 80 in which exterior voxel locations 87 define the external surface 88 of 3D object 80 and a group 176 of interior voxel locations 177 define the interior 75 of a first portion 71A of the 3D object 80. In some examples, each voxel location 87,177 comprises a width W2 and length L2, which forms a portion of a width W3 and a length L3 of first portion 71A.

In some examples, at least some of the first selectable voxel locations 74 (FIG. 1) and of the second selectable voxel locations 78 comprise interior voxel locations 177, i.e. interior to external surface 88 of the 3D object. However, in some examples, at least some of the first selectable voxel locations 74 to be disguised and some of the second selectable voxel locations 78 (to perform disguising) also may comprise external voxel locations 87. In some examples, the first selectable voxel locations 74 (to be at least partially disguised) comprise solely interior voxel locations 177, while the second selectable voxel locations 78 (to perform disguising) may comprise interior voxel locations 177 and/or exterior voxel locations 87.

As further shown in the diagram of FIG. 3, in some examples a device 200 comprises at least substantially the same features and attributes as device 20 (FIG. 1) except further comprising a radiation source 210 for irradiating the deposited build materials, fluid agents (e.g. fusing agent), etc. to cause heating of the material, which in turn results in the fusing of particles of the material relative to each other, with such fusing occurring via melting, sintering, etc. After such fusing, a layer 82A (e.g. FIG. 1) of build material is completely formed and additional layers 82A of build material may be formed in a similar manner as represented in FIG. 1.

In some examples, the radiation source 210 may comprise a gas discharge illuminant, such as but not limited to a Halogen lamp. In some examples, the radiation source 210 may comprise multiple energy sources. As previously noted, radiation source 210 may be stationary or mobile and may operate in a single flash or multiple flash mode.

As shown in FIG. 3, in some examples device 200 may comprise a control portion 217 to direct operations of device 200. In some examples, control portion 217 may be implemented via at least some of substantially the same features and attributes as control portion 460, as later described in association with at least FIG. 10A.

In some examples the device 20, 200 can be used to additively form a 3D object via a MultiJet Fusion (MJF) process (available from HP, Inc.). In some examples, an additive manufacturing process performed via device 20 may omit at least some aspects of and/or may include at least some aspects of: selective laser sintering (SLS); selective laser melting (SLM); 3D binder printing (e.g. 3D binder jetting); fused deposition modeling (FDM); stereolithography (SLA); or curable liquid photopolymer jetting (Polyjet).

As shown in FIG. 3, device 200 may comprise a fluid supply 230 to supply fluid agents 62. In some examples, fluid supply 230 is shown in greater detail in FIG. 4 and may comprise one example implementation to supply fluid agents 62 in FIG. 1.

As shown in FIG. 4, fluid supply 230 comprises reservoirs to hold various fluids, such as a carrier 92 (e.g. ink flux) by which various agents may be applied in a fluidic form. When combined into the carrier 92, the various agents may be referred to as fluid agents. Fluid supply 230 comprises an agent portion 234 to hold agents for application in association with the carrier 232 as fluid agents. In some examples, the agent portion 234 may hold fusing agent(s) 235, detailing agent(s) 236, color agent(s) 237, and a material property modifier agent 238. It will be understood that when a particular agent (e.g. fusing agent 235) is described as being applied via fluid dispenser 58, the fusing agent is being applied in a fluidic form via carrier 232 even though carrier 232 is not explicitly mentioned.

After selective application onto a layer of build material, the fusing agent 235 can cause fusing of the build material in response to radiation energy, such as via radiation source 210. Via the selective application of the fusing agent 235 to areas intended to be fused, other non-treated portions of build material can remain below the melting temperature of the build material and therefore not form part of the 3D object.

In some examples, the detailing agent 236 may be applied in some instances to affect a surface appearance or finish of a surface of the particular exposed layer of the build material forming the 3D object or may be applied for other purposes. For instance, in some examples the detailing agent 236 and/or another agent of agent portion 234 may be used to implement metamerism, by which at least some aspects regarding a size, shape, and/or distribution of the first color may be invisible under a first lighting condition (e.g. ordinary lighting) but made visible under a second lighting condition (e.g. special lighting). The metamerism may be applied selectively to at least some respective layers of the 3D object under formation and/or as an at least a portion of an external surface of a fully formed 3D object. In some examples, implementation of such metamerism may be implemented via the metamerism parameter 558 in the color disguising engine 540 in association with at least FIG. 11.

The color agent 237 may be used in some instances to affect a color of the particular portion of the 3D object to implement various example disguising color patterns as described throughout the present disclosure.

When applied as a second fluid agent to at least partially disguise a first color (such as a size, shape, and/or distribution of the first color), some examples of the color fluid agent 237 may act as, and/or in cooperation with, a fusing agent (e.g. 235) to influence absorbance of radiation to thereby influence fusing of the build material, without otherwise changing a material property of the first selectable voxel locations 74. In some such examples, the color agent 237 of the second fluid agent may comprise a dye or colorant.

As shown later in FIG. 5, more than one color may be represented by color agent 237 in FIG. 4 as in some examples, the fluid dispenser 58 may comprise one or several different color channels (e.g. Cyan, Magenta, Yellow, Black or Red, Green, Blue).

With this in mind, FIG. 5 is a table 220 schematically representing an example color map arranged in a sample format for illustrative simplicity. In one aspect, Table illustrates that each second selectable voxel location 78 at which a disguising color may be applied may be determinable according to multiple color channels in a multi-dimensional color space.

With this in mind, as shown in FIG. 5 table 220 comprises columns 222, 226, 228 representing different color channels, such as Red, Green, and Blue, respectively when a RGB color scale is employed. Meanwhile column 224 identifies particular voxel locations expressed in three axis space (x, y, z), such as locations (1, 5, 10) and (1, 6, 10) along with exhibited colors indicate via rows 230A, 230B. Similarly, as a further sample of color mapping, column 224 identifies a group of voxel locations (e.g. Group 1, Group 2) for which color is indicated via rows 230C, 230D.

With this general arrangement in mind, in row 230A one voxel location (1, 5, 10) has RGB values of (25, 80, 30) while in row 230B, an adjacent second voxel location (1, 6, 10) has RGB values of (25, 80, 60). As further shown in FIG. 5, in row 230C one voxel location for Group 1 has RGB values of (255, 0, 0) signifying a Red only color, and in row 230D one voxel location for Group 2 has RGB values of (0, 0, 180) signifying a Blue only color.

Rows 230A, 230B provide a similar example of a sample color mapping arrangement except with single voxel locations (1, 5, 10 and 1, 6, 10) instead of with groups of voxel locations.

It will be understood that the values of the respective color channels in the grid 325 are representative and that values intermediate of those shown may be interpolated and/or expressed explicitly in a more comprehensive color map exhibiting a full range (e.g. O to 255) of numerical values of the color channels.

With further reference to FIG. 4 and FIGS. 1-3 generally, in some examples the material property modifier agent 238 modifies at least one material property of the portion of build material onto which it is applied and as such may confer on a portion of the 3D object a first material property, such as an electrical property, mechanical property, chemical property, etc. At least some examples of the various material properties which may be modified via application of fluid agents (e.g. modifier agent 238) are described later in association with at least FIG. 11 generally, and in particular in association with material property engine 560 in FIG. 11.

As described throughout the present disclosure, at least some of the material property modifier agents 238, when applied to the build material, may exhibit a first color which becomes intrinsic to the respective portion of the 3D object to which it was applied.

With these general components of device 20 in mind, one example formation of an example 3D object 80 is described.

As shown in FIG. 1, device 20 manufactures 3D object 80 by forming a selectable number of layers 82A of a build material. This formation includes using material distributor 50 to coat the build pad 42 (or a preceding layer 82A) with a layer 82A of the build material. In some examples, a fluid agent 62 (e.g. at least a fusing agent) is then applied via fluid dispenser 58 at selectable portions on the current layer 82A. In some examples, irradiation of these selectable portions by the radiation source 210 (FIG. 3) results in fusing of the build material, fusing agents, detailing agents, etc. In some examples, this cycle of coating, dispensing and fusing is repeated until a selected number of layers 82A of build material is formed into 3D object 80 as shown in at least FIG. 1.

During the preceding method, as each layer 82A is being formed, the fluid dispenser 58 dispenses a disguising color at second selectable voxel locations 78 of at least some respective layers 82A, as shown in FIG. 1.

In some examples, the disguising color(s) dispensed at these second selectable voxel locations 78 enable at least partially disguising the first color (and associated material property) embodied in the first selectable voxel locations 74 of at least some layers 82A of 3D object 80.

Several examples of at least some aspects of additively manufacturing a 3D object are described below in association with at least FIGS. 6-9D. In some examples, each of the various aspects described in association with at least FIGS. 6-9D comprise at least some of substantially the same features and attributes as previously described for device 20, 200 in association with FIG. 1-4.

FIG. 6A is a diagram schematically representing a plurality of example at least partially formed 3D objects 284, 286 being manufactured at the same time but each including its own internal first color distribution. As shown in FIG. 6A, block 281A represents a structure formed of layers (e.g. 282) including the at least partially formed the 3D objects 284, 286. In some examples, 3D objects 284, 286 are formed via at least some of substantially the same features and attributes as previously described in association with at least FIGS. 1-5 and/or later described in association with at least FIGS. 10A-12. While objects 284, 286 may have any desired shape and/or size, as shown in FIG. 6A they each have a generally cylindrical or disc shape. Moreover, in some examples, object 284 may have a shape and/or size different than object 286. After complete formation of 3D objects 284, 286, any extraneous material of block 281A will be discarded.

In some examples, as shown in FIG. 6A, the exposed layer 285 of 3D object 284 comprises (at least) one first color 283 associated with one first material property and exposed layer 287 of 3D object 286 comprises another first color 288 associated with another different first material property. However, as shown in FIG. 6A, as represented by the generally homogenous first colors 283, 288 in the respectively exposed layers 285, 287, the first material property in at least some layers of object 284 and of object 286 may be homogenously distributed.

However, as described later in association with at least FIGS. 7A-9D, in at least some examples the first material property of at least some respective layers of at least one of the respective 3D objects 285, 287 may be heterogeneous, i.e. having a variable amount, size, shape, etc. of the first material property within a given layer. Accordingly, in some such examples, the respective first color 283, 288 may not be homogenous, but instead may have a heterogeneous appearance reflecting the heterogeneous distribution of the respective first material property.

With further reference to at least FIG. 6A, in some examples, the two first colors 283 and 288 are associated with intrinsic characteristics of the material properties of at least layers 285, 287 of the 3D objects 284, 286.

In some examples, at least some layers of 3D object 284 may exhibit different volumes or intensities of the same first material property than at least some layers of 3D object 286. For instance, in just one example, the first material property may be magnetism with at least some layers of one object 284 exhibiting more magnetism than at least some layers of object 286. In such examples, the exposed layer 283 of first 3D object 284 exhibits a first color 285 associated with a first value of a first material property and the exposed layer 288 of second 3D object 286 exhibits a second color 288 associated with a different second value of the same first material property.

Moreover, varying layers of any single 3D object (e.g. 284 and/or 286) may exhibit different volumes or intensities of a first material property (or properties).

As shown in FIG. 6B, in some examples a disguising color 291, 292 may be applied to and/or form part of the respective exposed layers 285, 287 of partially formed 3D objects 284, 286 which would otherwise exhibit first colors 283, 288 in the absence of the application of the disguising colors 291, 292. It will be understood that while FIG. 6B generically represents the disguising colors 291, 292 in a block pattern 293, 295 for illustrative simplicity, it will be understood that the respective disguising colors 291, 292 may be implemented as any one of, or a combination of, the example disguising patterns described in association with at least FIGS. 7A-9D and FIG. 11, as well as other sizes and/or shapes suitable to effectively disguise the first color 283, 288 of at least some layers 285, 287 of a 3D object 284, 286.

Moreover, in addition to or instead of employing shapes and/or sizes other than a block pattern (e.g. 293, 295), in some examples at least one of the given disguising patterns 293, 295 may comprise at least two different colors arranged in a wide variety of arrangements, at least some of which are described further in association with at least FIGS. 7A-9D and 11.

As shown in FIG. 6B, the two disguising colors 291, 292 are different from each other and are different from the respective first color 283, 288 which they obscure. However, in some examples, the two disguising colors 291, 292 may be the substantially the same color.

In some examples, the disguising color 291, 292 in disguising pattern 293, 295 may be printed as a second fluid agent substantially at the same time as the first fluid agent comprising the first color and first material property agent. Accordingly, via such example arrangements, any size, shape or pattern of the respective first colors 283, 288 that might otherwise be recognizable (in the absence of the disguising colors 291, 292) may become substantially unrecognizable to a viewer.

However, in some examples, the second fluid agent which comprises the disguising colors 291, 292 may be dispensed in blanket pattern or selective pattern prior to dispensing of the first fluid agent (comprising the first colors 283, 288) such that first color 283, 288 (and any associated size, shape, pattern) effectively disappears (e.g. becomes subsumed, absorbed, etc.) into in the previously deposited second fluid agent (comprising the disguising colors 291, 292 in patterns 293, 295) forming the same respective layer (e.g. 285, 287) of the partially formed 3D object 284, 286. In this way, the disguising colors 291, 291 may prevent or hinder comprehension of the respective first colors 283, 288 (and any associated size, shape, and pattern) in the respective layer 285, 287 of the 3D object 284, 286 during its formation.

Moreover, in some examples, the second fluid agent which comprises the disguising colors 291, 292 may be dispensed in a blanket pattern or selective pattern after dispensing of the first fluid agent (comprising the first color 283, 288) such that second color 291, 292 (and any associated size, shape, pattern) quickly covers the first colors 283, 288 to prevent or hinder meaningful comprehension of the first color 283, 288 (and any associated size, shape, and pattern) in forming the same respective layer 285, 287 of the partially formed 3D object 284, 286.

Via such example arrangements, the disguising colors 291, 292 may prevent or hinder comprehension of the respective first colors 283, 288 (and their size, shape, and distribution) thereby disguising information such as a purpose, function, operation, identification, security, structure, manufacture, materials, effect, etc. of the 3D objects 284, 286 generally or of at least some of its layers.

FIG. 7A is a diagram including a top plan view schematically representing an exposed layer of an example at least partially formed 3D object 300. As shown in FIG. 7A, in some examples, the 3D object 300 may comprise a disc-shaped object, in which colors 302, 306, 304 of the concentric rings each correspond to a different first material property. One first color 302 is represented via a diagonal line pattern, one first color 304 is represented via a vertical line pattern, and one first color 306 is represented via a finely dotted pattern. In some examples, the 3D object 300 may comprise an ingestible tablet such as a pharmaceutical in which at least one of the colored rings 302, 304, 306 is a pharmaceutical ingredient or composition. However, it will be understood that 3D object 300 may comprise any type of object for any purpose and that 3D object 300 provides just one example shape and size to illustrate some example features and attributes of applying a disguising color pattern to disguise first color(s) of at least some layers of an at least partially formed 3D object.

FIG. 7B is a diagram 310 including a top plan view schematically representing an example disguising color pattern 312 applied as part of an exposed layer of an example at least partially formed 3D object. In some examples, the disguising color pattern 312 may be implemented via at least some of substantially the same features and attributes as at least some of the disguising patterns and colors as described in association with FIGS. 1-6B and/or FIGS. 8A-12. Accordingly, in just one aspect, the disguising color pattern 312 may be applied before, during, or after formation of first color rings 302, 304, 306.

As shown in FIG. 7B, a disguising color pattern 312 has been applied to disguise the size, shape, and relative distribution of different colors 302, 304, 306 in their concentric ring pattern. In one aspect, the disguising color pattern 312 comprises a uniform, relatively homogenous pattern. In some examples, the disguising color pattern 312 may be implemented via half-toning in which some different colors are added via half-toning techniques in a complementary combination with the existing first colors 302, 304, 306 (of at least partially formed 3D object 300) to achieve a single uniform disguising color pattern 312.

In some instances, the disguising color pattern 312 may be understood as being applied across substantially the entire exposed layer at which the different first colors 302, 304, 306 are present.

However, in some examples, the disguising color pattern 312 applied to at least some layers of 3D object 300 may comprise a heterogeneous pattern of multiple second colors instead of a homogenous pattern of a single second color (represented via diagonal lines in this example). In some such examples, the second color may be substantially the same as one first color on (at least some respective layers of) the first portion of the 3D object and may be different or substantially different than another first color on (at least some respective layers of) the first portion of the 3D object.

Via such example arrangements, the disguising color pattern 312 may prevent or hinder comprehension of the respective first colors 302, 304, 306 (and their size, shape, and concentric pattern) thereby disguising information such as a purpose, function, operation, identification, security, structure, manufacture, materials, effect, etc. of the 3D object 300 generally or of at least some of its layers.

In some examples, as represented via dotted shading in the diagram 313 of FIG. 7C, a fusing agent may be applied to an entire layer of the at least partially formed 3D object 314. The fusing agent may be applied before, during, or after application of the disguising color/pattern 312.

FIG. 8A is a diagram 320 including a top plan view schematically representing an exposed layer of an example at least partially formed 3D object comprising at least portions 323, 325, 327 each having a different color 324, 326, 328, respectively. In some examples, each of the different colors (e.g. 324, 326, 328) correspond to a different first material property for each of the different respective portions 323, 325, 327.

In some examples, at least portions 323, 325, 327 together may form a single monolithic component 332, i.e. 3D object 332. In some examples the portion 321 comprises a build material surrounding a 3D object comprised of a combination of subportions 323, 325, 327 with portion 321 having a color 322 (as represented by vertical lines) other than the first colors 324, 326, 328. In some examples, as shown later in FIGS. 8B-8C, the color 322 may sometimes be used as part of a disguising pattern 340 to disguise the 3D object 332 formed by portions 323, 325, 327 having colors 324, 326, 328.

However, in some examples, along with portions 323, 325, 327, portion 321 forms part of a 3D object 334. In some such examples, portions 321, 323, 325, 327 may form a single monolithic component or object. Accordingly, in some such examples, portion 321 also may be considered to have its own first material property, which can be inferred in some instances via color 322.

Figure 8B:
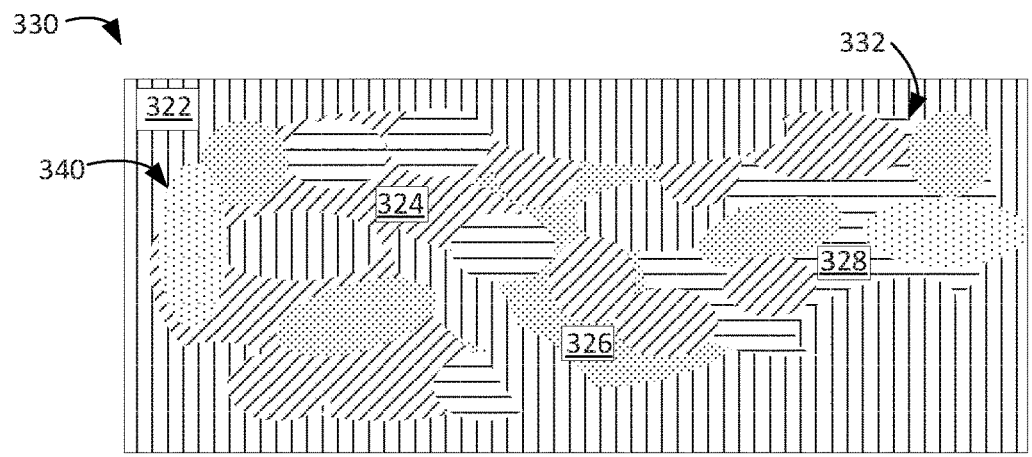
FIG. 8B is a top plan view schematically representing an example disguising color pattern on the exposed layer of the example at least partially formed 3D object of FIG. 8A.

FIG. 8B is a diagram 330 including a top plan view schematically representing an example disguising color pattern 340 on an exposed layer of an example at least partially formed 3D object 332. As in FIG. 6B, the application of the disguising color pattern 340 may occur before, during, and/or after the application of at least first colors 324, 326, 328 of a 3D object 332. Given the relative complexity of the disguising color pattern 340, the disguising color pattern 340 is reproduced in FIG. 8C apart from the at least partially formed 3D object.

Figure 8C:
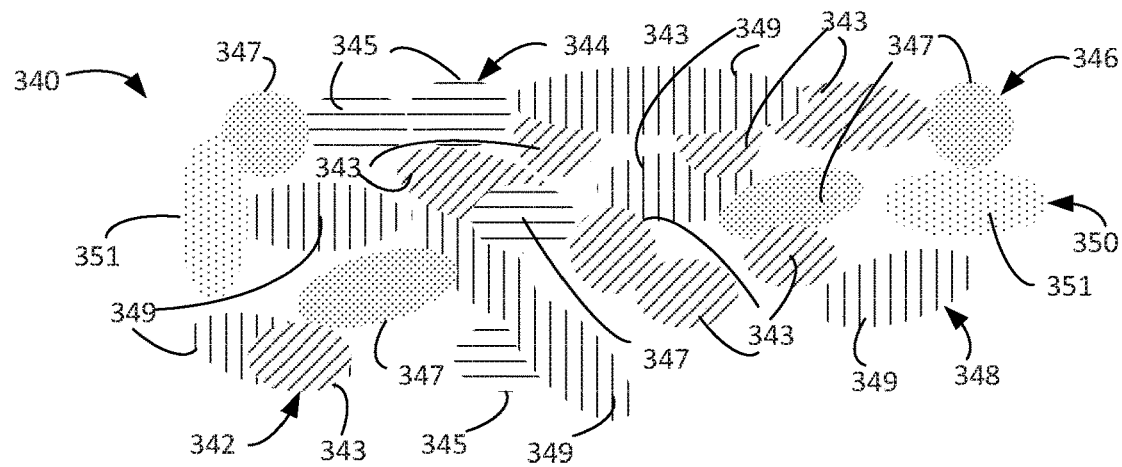
FIG. 8C is a top plan view schematically representing an example disguising color pattern.

As shown in FIGS. 8B-8C, the disguising color pattern 340 comprises a plurality of disguising elements (further identified below) in a plurality of second colors arranged to disguise a size, shape, and distribution of at least first colors 324, 326, 328 (forming portions 323, 325, 327) of 3D object 332.

In some examples, the disguising pattern 340 may sometimes be referred to as a camouflage pattern, which may be implemented in some examples via camouflage parameter 546 in disguising color engine 540 in manufacturing engine 500, as later described in association with at least FIG. 11.

In some examples, the disguising color pattern 340 may comprise some of the same colors (323, 325, 327) of the first portions 324, 326, 328 placed in a manner to confuse or obfuscate a size, shape and/or distribution of the first colors 324, 326, 328 of the portions 323, 325, 327.

For instance, the disguising color pattern 340 may comprise one group 344 of disguising color elements 345 which may have the same color (as represented by horizontal lines) as the color 328 of portion 327 of 3D object 332 while another group 346 of disguising color elements 347 may have the same color (as represented by closely adjacent dots) as the color 326 of portion 325 of 3D object 332. Meanwhile, in some examples, group 348 of disguising color elements 349 may have the same color (as represented by vertical lines) as the color 322 of portion 321. In addition, in some examples, the disguising color pattern 340 may further employ a group 350 of disguising color elements 351 which have a second color which does not correspond directly to any of the first colors 324, 326, 328 of the first portions 323, 325, 327 of 3D object 332 or to color 322 of portion 321.

As shown in FIG. 8B-8C, at least some of the various disguising elements (e.g. 345, 347, 349, 351) of the disguising color pattern 340 may have different shapes (e.g. circular, elliptical, etc.) which may or may not correspond to the shape of the portions 323, 325, 327 to be disguised. In some examples, the various disguising color elements (e.g. 345, 347, 349, 351) of the disguising color pattern 340 may have sizes smaller than the first subportions to be disguised, which may permit strategic juxtaposition and overlap of various sizes and/or shapes of at least disguising elements 345, 347, 349, 351 in their various second colors.

Via such an example disguising color pattern 340, a size, shape and/or distribution of portions 323, 325, 327 of 3D object 332 may be disguised, thereby preventing or hindering comprehension about the function, purpose, operation, identification, security, materials, manufacture, structure, effect, etc. of the 3D object 332 generally and/or at least some layers of the 3D object 332.

In some examples, at least some of the features and attributes of the disguising color pattern 340 in FIGS. 8B-8C may be implemented via at least substantially the same features and attributes as described in association with at least FIGS. 1-7C and 9A-12.

Figure 9A:
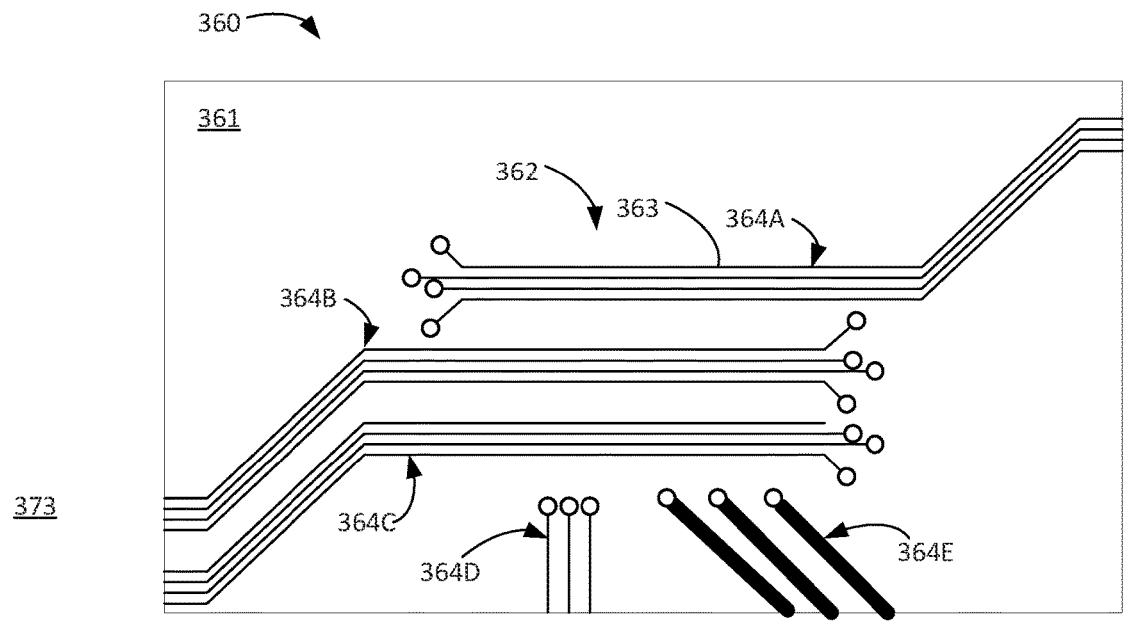
FIG. 9A is a top plan view schematically representing an exposed layer of an example at least partially formed 3D object.

FIG. 9A is a top plan view schematically representing an exposed layer of an example at least partially formed 3D object 360.

In some examples, the 3D object 360 comprises a substrate 361 on which is formed circuitry 362 comprising conductive traces such as groups of conductive traces 364A, 364B, 364C, 364D, 364E. In some examples, the different conductive traces 364A, 364B, 364C, 364D, 364E are all the same first color 363. However, in some examples, at least some of the conductive traces may comprise a color different than some of the other conductive traces.

Figure 9B:
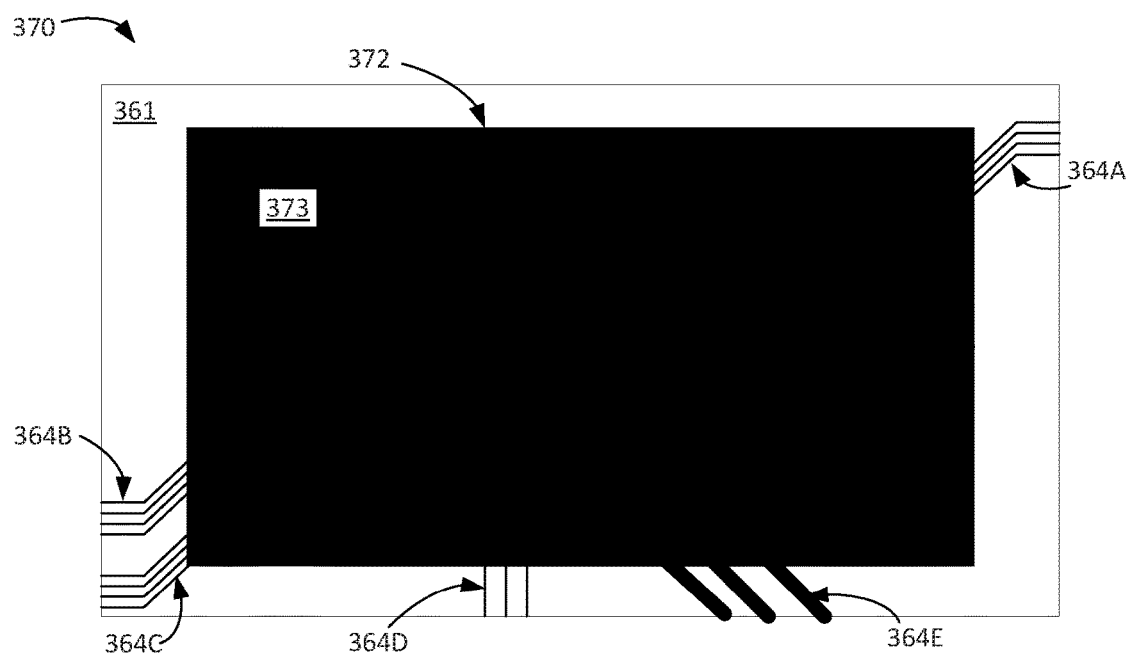
FIG. 9B-9D are each a top plan view schematically representing an example disguising color pattern on the exposed layer of the example at least partially formed 3D object of FIG. 9A.

FIG. 9B is a top plan view schematically representing an example disguising color pattern 372 on an exposed layer of an example at least partially formed 3D object 370. As shown in FIG. 9B, the disguising color pattern 372 is arranged to disguise circuitry 362 via blanketing or covering the first color 363 of circuitry with the second color 373. While FIG. 9B depicts the disguising pattern 372 as a uniform second color 373, the disguising pattern 372 may comprise at least two different second colors, may comprise shapes other than a rectangle, and/or may comprise a non-uniform pattern of different colors. In some examples, the second color 373 of disguising pattern 372 may comprise the same color as the first color 363 of circuitry 362. However, in some examples, the color 373 of the disguising pattern 372 may comprise a different color than first color 363 provided that the disguising color 373 is sufficiently dark to disguise or obscure the first color 363 (and its associated size, shape, and distribution) of the conductive traces of circuitry 362.

In some examples, at least some of the features and attributes of the disguising pattern 372 described in association with FIG. 9B may be implemented via at least parameters 542, 543, 544, 545 (e.g. different, same, blanket, uniform) in disguising color engine 540 of manufacturing engine 500 in FIG. 11.

Figure 9C:
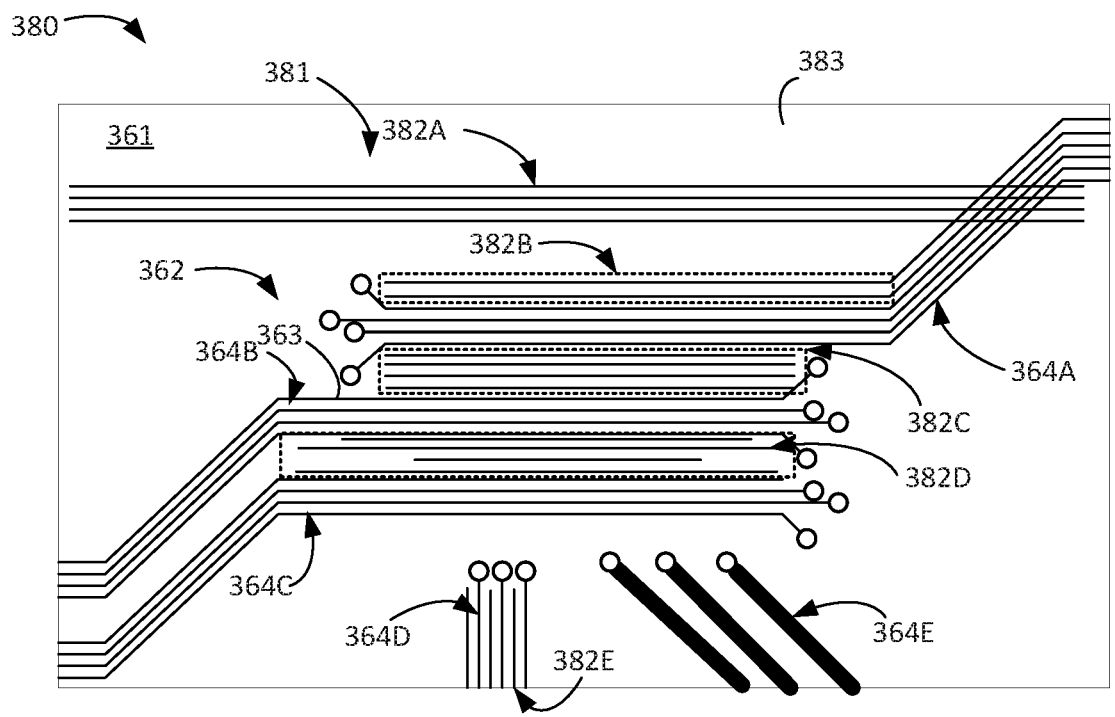

FIG. 9C is a diagram 380 including a top plan view schematically representing an example disguising color pattern 381 on an exposed layer 383 of an example at least partially formed 3D object. In some examples, the circuitry 362 may comprise at least some of substantially the same features and attributes as circuitry 362 as previously described in FIG. 9A. As shown in FIG. 9C, the formation of the circuitry 362 in the first color 363 on the exposed layer 383 is accompanied by the formation of a disguising pattern 381 of a second color, with disguising pattern 381 comprising a plurality of different disguising color elements 382A, 382B, 382C, 382D, 382E. In some examples, these disguising elements of second color 383 do not form actual electrically conductive traces but may have the same general appearance (e.g. size, shape, distribution) as the conductive traces 364A-364E (FIG. 9A, 9C). In this way, the disguising color pattern 381 may provide disinformation to disguise the details (e.g. size, shape, distribution) of actual circuitry 362 which may might otherwise reveal (in the absence of the disguising color pattern 381) a function, purpose, operation, identification, security, structure, materials, manufacture, effect, etc. of the 3D object generally and/or of at least some layers in which the particular circuitry elements would have been visible.

In some examples, some disguising color elements (e.g. 382C, 382D, 382E) may be referred to as filling-in open space between adjacent conductive traces (e.g. 364A, 364B, 364E) or as being interlineated among surrounding parallel conductive traces (e.g. 364A, 364B). In some examples, some disguising elements (e.g. 382A) may be sometimes be referred to as being a decoy by providing a separate, independent pattern spaced apart from other groups of conductive traces 364A-364E. Via such disguising color pattern 381, the actual circuitry 362 may be sometimes be referred to as being hidden in plain sight. In the eyes of a viewer viewing formation of the 3D object 360, these example disguising color elements 382A, 382C, 382C, 382D etc. may introduce doubt regarding the function, purpose, operation, identification, security, structure, manufacture, materials, effect, etc. of circuitry 362.

In some examples, at least some of the features and attributes of the disguising pattern 381 described in association with FIG. 9C may be implemented via at least parameters 542, 543, 548, 549, 550 (e.g. different, same, fill-in, interlineation, decoy, plain sight) in disguising color engine 540 of manufacturing engine 500 in FIG. 11, as further described later.

Figure 9D:
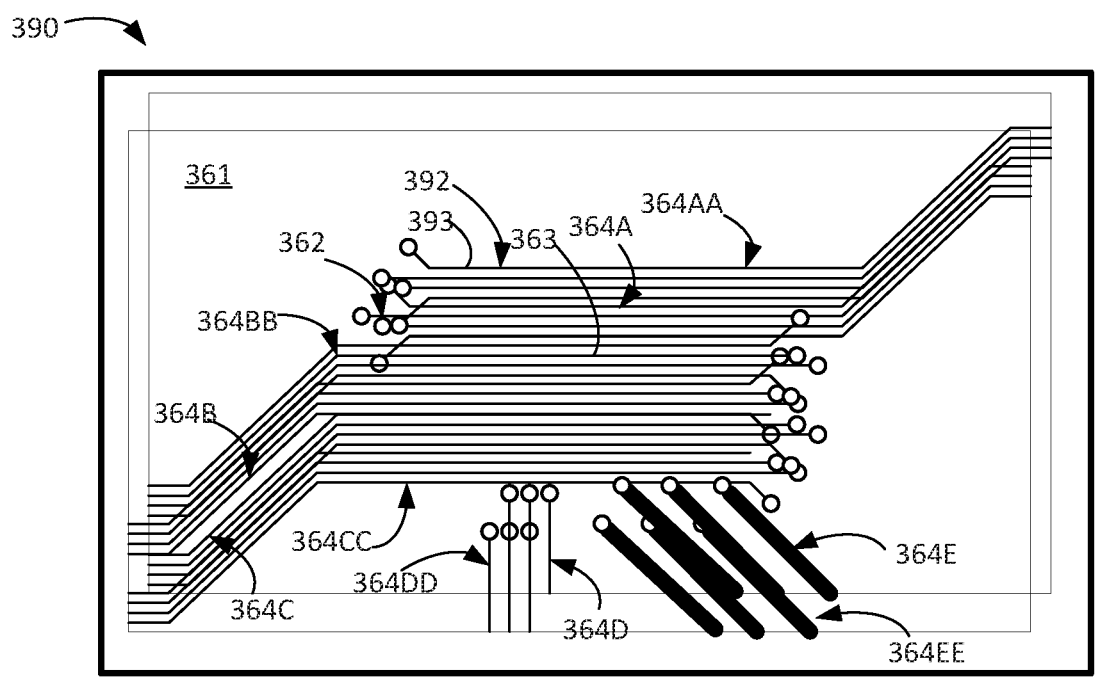

FIG. 9D is a diagram 390 including a top plan view schematically representing an example disguising color pattern 392 on an exposed layer of an example at least partially formed 3D object. In some examples, the circuitry 362 may comprise at least some of substantially the same features and attributes as circuitry 362 as previously described in FIG. 9A. As shown in FIG. 9D, the formation of the circuitry 362 in the first color 363 on the exposed layer of the 3D object is accompanied by the formation of a disguising color pattern 392 (e.g. a second color) comprising a plurality of different disguising color elements 364AA, 364BB, 364CC, 364DD, 364EE. In some examples, these disguising color elements do not form actual electrically conductive traces but may have some characteristics similar to the same general appearance (e.g. size, shape, distribution) of the conductive traces 364A-364E (FIG. 9A,9D). In this way, the disguising color pattern 392 provides disinformation to disguise the details (e.g. size, shape, distribution) actual circuitry 362 which might otherwise reveal (in the absence of disguising color pattern 392) a function, purpose, operation, identification, security, materials, structure, manufacture, effect, etc. of the 3D object generally and/or of at least some layers of the 3D object.

In some examples, at least some disguising color elements (e.g. 364AA, 364BB, etc.) may be referred to as providing a mirror pattern and/or a double image of the actual conductive traces (e.g. 364A, 364B, 364E) such that the juxtaposition of the disguising color elements (e.g. mock traces) and the actual conductive traces may prevent or hinder one from identifying which traces are the actual conductive traces. Via such disguising pattern 392, the actual circuitry 362 may be sometimes be referred to as being hidden in plain sight. In the eyes of a viewer viewing formation of the 3D object 360, these example disguising subpatterns 364AA, 364BB, etc. may introduce doubt regarding the function, purpose, operation, identification, security, structure, manufacture, materials, effect, etc. of the actual circuitry 362.

In some examples, at least some of the features and attributes of the disguising color elements 364AA, 364BB, 364CC, 364DD, 364EE as described in association with FIG. 9D may be implemented via at least parameters 550, 552, 553 (e.g. plain sight, multiple image, mirror) in disguising color engine 540 of manufacturing engine 500 in FIG. 11, as further described later.

In some examples, at least some of the features and attributes of the disguising color patterns described in association with FIGS. 9A-9C may be implemented via at least substantially the same features and attributes as described in association with at least FIGS. 1-8C and 10A-12.

It will be understood that the at least some of substantially the same features and attributes of implementing a disguising color pattern in association with at least FIGS. 9A-9D may be applied to layers and/or portions of a 3D object which are not electrically conductive.

FIG. 10A is a block diagram schematically representing an example control portion 460. In some examples, control portion 460 provides one example implementation of the control portion 217 (FIG. 3) and/or a control portion forming a part of, implementing, and/or managing any one of the devices, components, material distributors, fluid supply, fluid dispensers, radiation sources, instructions, engines, functions, parameters, and/or methods, as described throughout examples of the present disclosure in association with FIGS. 1-9D and 11-12.

In some examples, control portion 460 includes a controller 462 and a memory 470. In general terms, controller 462 of control portion 460 comprises at least one processor 464 and associated memories. The controller 462 is electrically couplable to, and in communication with, memory 470 to generate control signals to direct operation of at least some the devices, components, material distributors, fluid supply, fluid dispensers, radiation sources, instructions, engines, functions, parameters, and/or methods, as described throughout examples of the present disclosure. In some examples, these generated control signals include, but are not limited to, employing instructions 471 stored in memory 470 to at least direct and manage additive manufacturing of 3D objects in the manner described in at least some examples of the present disclosure. In some examples, at least some instructions 471 are implemented via manufacturing engine 500 in FIG. 11.

In response to or based upon commands received via a user interface (e.g. user interface 480 in FIG. 10B) and/or via machine readable instructions, controller 462 generates control signals to implement additive manufacturing of a 3D object in accordance with at least some of the examples of the present disclosure. In some examples, controller 462 is embodied in a general purpose computing device while in some examples, controller 462 is incorporated into or associated with at least some of the devices, components, material distributors, printing assembly, fluid supply, fluid dispensers, radiation sources, instructions, engines, functions, parameters, and/or methods, etc. as described throughout examples of the present disclosure.

For purposes of this application, in reference to the controller 462, the term "processor" shall mean a presently developed or future developed processor (or processing resources) that executes sequences of machine readable instructions contained in a memory. In some examples, execution of the sequences of machine readable instructions, such as those provided via memory 470 of control portion 460 cause the processor to perform actions, such as operating controller 462 to implement additive manufacturing of 3D objects as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 470. In some examples, memory 470 comprises a computer readable tangible medium providing non-volatile storage of the machine readable instructions executable by a process of controller 462. In other examples, hard wired circuitry may be used in place of or in combination with machine readable instructions to implement the functions described. For example, controller 462 may be embodied as part of at least one application-specific integrated circuit (ASIC). In at least some examples, the controller 462 is not limited to any specific combination of hardware circuitry and machine readable instructions, nor limited to any particular source for the machine readable instructions executed by the controller 462.

Figure 12:
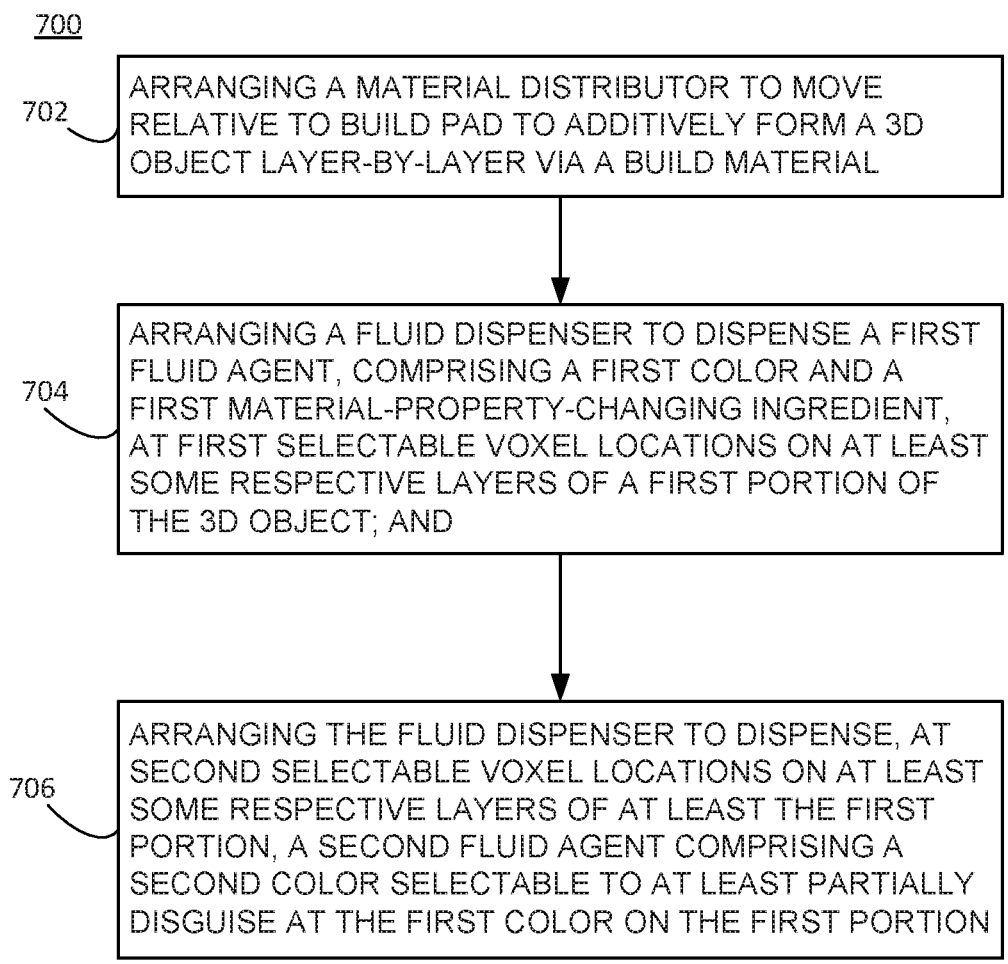
FIG. 12 is a flow diagram schematically representing an example manufacturing method.

In some examples, control portion 460 may be entirely implemented within or by a stand-alone device, which has at least some of substantially the same features and attributes as device 20 as previously described in association with at least FIGS. 1-9D and at least FIGS. 11-12. In some examples, the control portion 460 may be partially implemented in the device 20 and partially implemented in a computing resource separate from, and independent of, the device 20 but in communication with the device 20.

In some examples, control portion 460 includes, and/or is in communication with, a user interface 480 as shown in FIG. 10B. In some examples, user interface 480 comprises a user interface or other display that provides for the simultaneous display, activation, and/or operation of at least some of the devices, components, material distributors, fluid supply, fluid dispenser, radiation sources, instructions, engines, functions, parameters, and/or methods, etc. as described in association with FIGS. 1-9D and 11-12. In some examples, at least some portions or aspects of the user interface 480 are provided via a graphical user interface (GUI), and may comprise a display 484 and input 482.

FIG. 11 is a block diagram schematically representing an example manufacturing engine 500. In some examples, the manufacturing engine 500 directs and manages additive manufacturing of a 3D object, including layering build materials, dispensing fluid agents, and/or applying radiation relative to a receiving surface to additively form a three-dimensional (3D) object. In some examples, manufacturing engine 500 provides at least some example implementations of instructions 471 in memory 470 associated with control portion 460 (FIG. 10A).

In some examples, manufacturing engine 500 provides one example by which at least some examples described in association with at least FIGS. 1-10B and 12 may be implemented.

As shown in FIG. 11, in some examples manufacturing engine 500 comprises a material distributor engine 510, fluid dispenser engine 520, radiation source engine 530, disguising color engine 540, material property engine 560, and composition engine 580.

As shown in FIG. 11, in some examples the material distributor engine 510 controls distribution of layers of build material relative to build pad (e.g. 42 in FIG. 1) and/or previously deposited layers of build material.

In some examples, the material distributor engine 510 comprises a material parameter 512 to specify which material(s) and the quantity of such material which can be used to additively form a body of the 3D object. In some examples, these materials are deposited via build material distributor 50 of device 20 (FIG. 1).

In some examples, the material controlled via material parameter 512 of material distributor engine 510 may comprise polymers, ceramics, etc. having sufficient strength, formability, toughness, etc. for the intended use of the 3D object with at least some example materials being previously described in association with at least FIG. 1.

As shown in FIG. 11, in some examples the fluid dispenser engine 520 may specify which fluid agents are to be selectively deposited onto a layer of build material. In some examples, such agents are deposited via fluid dispenser 58 (FIG. 1). In some examples, the fluid dispenser engine 520 may comprise a carrier function 522 and an agent function 524 to apply fluid agents, such as the carrier, fusing, detailing, color, and material property modifier agents 232, 235, 236, 237, 238 as previously described in association with at least FIG. 4.

In some examples, fluid dispenser engine 520 may specifying a number of fluid application channels, volume of fluid to be applied, during which pass the particular fluid channel is active, etc.

In some examples, manufacturing engine 500 comprises a radiation source engine 530 to control operations of at least one radiation source (e.g. 210 in FIG. 3). In some examples, the radiation source engine 530 may control an amount of time that energy from the radiation source 210 (FIG. 3) emitted toward the material, agents, etc. on a layer of build material. In some examples, the radiation source may irradiate the targeted layer (of the 3D object under formation) in a single flash or in multiple flashes. In some examples, the radiation source may remain stationary (i.e. static) or may be mobile. In either case, during such irradiation, the radiation source engine 530 controls the intensity, volume, and/or rate of irradiation.

In general terms, the composition engine 580 of manufacturing engine 500 enables the selection of attributes by which the selected fluid agents are deposited via fluid dispenser engine 520. For instance, in some examples the composition engine 580 comprises a location parameter 581, a size parameter 582, a shape parameter 583, a quantity parameter 585, and a spacing parameter 586. The location parameter 581 can specify a location at which the various agents and/or a structural feature of the 3D object is located. For instance, the location parameter 581 can specify a location at which a particular disguising color and/or material property modifier agent 238 (and its associated first color) may be applied. Meanwhile, the size parameter 582 can specify a size of the area over which the particular agent (e.g. color, other, etc.) may be deposited. The size can be specified as an absolute quantity or as a relative quantity, i.e. a size relative to a size or volume of the surrounding material not receiving a particular agent.

In some examples, the shape parameter 583 enables specifying a shape over which a particular agent (e.g. color, other, etc.) is deposited, which can be absolute or relative to the general shape of the 3D object. In some examples, the quantity parameter 585 enables specifying a quantity of locations at which a particular agent is deposited on a layer of material. In some examples, the spacing parameter 586 enables specifying a spacing between multiple locations at which a particular agent is deposited.

In some examples, the manufacturing engine 500 may comprise a disguising color engine 540. In general terms, the disguising color engine 540 may direct application of colors in a manner to disguise a first color in at least some layers of an at least partially formed 3D object. In some examples, the disguising color engine 540 comprises a color parameter 541 to specify which disguising color(s) are applied to disguise the respective first color. Per parameters 542, 543, the disguising color(s) may be different than or the same as the first color(s) to be disguised. With regard to color parameter 541, it will be understood that in some examples, color may be specified as a grey scale (e.g. black and white shading) color in which different grey scale color levels may indicate a first material property and/or be used to disguise another grey scale color.

In some examples, per blanket parameter 544, the disguising color(s) may be applied in a blanket pattern (e.g. FIG. 6B or 9B) to entirely cover or substantially entire cover the first color. In some examples, per uniform parameter 546, the disguising color(s) may be applied in a uniform pattern (e.g. FIG. 6B, 7B or 9B) which is generally homogeneous.

In some examples, per camouflage parameter 546, the disguising color(s) may be applied in a camouflage pattern (e.g. FIGS. 8B-8C) with control over the colors, number, type, size, shape, distribution, etc. of the various camouflage elements.

In some examples, per half-toning parameter 547, the disguising color(s) may be applied via half-toning multiple different first colors (e.g. FIG. 7B), with or without a second color different than the first colors.

In some examples, per fill-in parameter 548, the disguising color(s) may be applied to fill-in open spaces (e.g. FIGS. 9C, 9D) between adjacent first color elements in order to disguise the first color. In some examples, such filling in may take the form of interlineation per parameter 594 (e.g. FIGS. 9C, 9D).

In some examples, per decoy parameter 550, the disguising color(s) may be applied to open spaces (e.g. FIG. 9C) away from first color elements to act as a decoy relative to the first color elements.

In some examples, per distortion parameter 551, the disguising color(s) may be applied to add distortion at portions of the first color elements to hamper comprehension of the first color elements.

In some examples, per multiple image parameter 552 and/or mirror image parameter 554, the disguising color(s) may be applied in patterns which duplicate the first color elements while being juxtaposed (e.g. FIG. 9D) between similar appearing adjacent first color elements in order to disguise the first color.

In some examples, to the extent that the disguising color is applied to obfuscate (e.g. hinder comprehension) of the first color(s) without necessarily directly covering the first color, the disguising color may be sometimes be described as hiding the first color in plain sight, which is controllable via parameter 553 in some examples.

In some examples, per pseudo-random parameter 556, the disguising color(s) may be applied pseudo-randomly near, on, away from, etc. first color elements to disguise the first color elements. In some examples, the pseudo-random parameter 556 may function in cooperation with at least the camouflage parameter 546, among other parameters of disguising color engine 540.

In some examples, per parameters 555, 557, the disguising color(s) may be applied as a gradient of changing color or as discrete color elements.

In some examples, per parameter 558, the disguising pattern may be applied to exhibit metamerism, as previously described in association with at least agent portion 234 in at least FIG. 4.

It will be apparent from at least the examples in FIGS. 6A-9D and the foregoing description of disguising color engine 540 that at least some of the parameters 541-557 are complementary and may be implemented concurrently and/or interdependently, while some other parameters may be implemented independently.

As shown in FIG. 11, in some examples manufacturing engine 500 may comprise a material property engine 560 to specify which material properties on a particular portion (e.g. 71A, 71B in FIG. 1) are to be modified via application fluid agents, such as material property modifier agent 238, and irradiation per radiation source 58.

In some examples, at least some portions of at least some layers of the build material may already at least partially exhibit the material property (e.g. mechanical, electrical, chemical) specified for the selected/targeted locations without, or prior to, any operation or action by the fluid dispenser 58 and material property engine 560. Hence, in some examples various parameters of the materials property engine 560 may track and/or reflect such already existing material properties of the 3D object.

In some examples, material property engine 560 comprises a mechanical parameter 561, electrical parameter 570, chemical parameter 577, multi-property parameter 578, and degree parameter 579.

In some examples, the mechanical parameter 561 may comprise a structure parameter 562, strength parameter 563, a hardness parameter 564, and/or ductility parameter 568.

In some examples, the structure parameter 562 may specify that at least some portions of at least some of the formed layers exhibit a structural framework, such as defining a latticework, foam structure, etc.

At least some of these structural properties may selectively cause the build material (influenced at least by material property modifier agent 238) to exhibit mechanical, electrical and/or chemical properties which may not ordinarily considered an intrinsic material property of the particular build material forming a 3D object 70. In some examples, such structural properties may influence and/or define other properties (e.g. electrical, chemical, other mechanical properties) specifiable by the material property engine 560.

In some examples, the mechanical property parameter 561 may comprise a magnetic parameter 565, an optical parameter 566, a thermal parameter 567, and/or other parameter 569. Via such parameters, the fluid agent engine 520 may select and/or control the extent to which the first fluid agent (including a second material in some examples) exhibits various magnetic, optical, thermal, and/or properties.

It will be understood that other, different mechanical properties also may be selected and/or controlled via mechanical property parameter 561. Accordingly, parameters 562, 563, 564, 565, 566, 567, 568, 569 do not define the full range of mechanical properties which may be selected and/or controlled via mechanical property parameter 561.

In some examples, a material property of at least a portion of a 3D object may be at least partially specified and/or at least partially determined via an electrical property parameter 570. For instance, via parameter 570, the material property may comprise electrically conductive properties (571), an electrically insulative properties (572), semi-conductive properties (574), and/or other electrical properties. Such material properties may be used to form various circuitry elements within and/or on the 3D object and/or may be used to form other non-circuitry features.

In some examples, a material property of at least a portion of a 3D object may be at least partially specified and/or at least partially determined via the chemical property parameter 577. For instance, via parameter 577, the second fluid agent may control and/or comprise chemical features, such as but not limited to, corrosion, reactivity, etc.

In some examples, some of the specifiable mechanical, electrical, and/or chemical properties may influence and/or at least partially define at least some of the other respective mechanical, electrical, and/or chemical properties of the formed layers.

In some examples, a material property of at least a portion of a 3D object may be specified via a multi-property parameter 578 to select or implement multiple different properties for selectable voxel locations. In some examples, just one selectable property may be implemented for one group of voxel locations (e.g. first portion 72 in FIG. 1), with other selectable properties being implemented at other groups of voxel locations (e.g. second portion 74 in FIG. 1).

The degree parameter 579 may specify a degree to which any particular material property specified via engine 560 is exhibited in the 3D object, such that it will be understood that the presence or absence any given material property is not expressed in a strictly binary manner, in at least some examples.

It will be understood that other, different mechanical, electrical, and/or chemical properties also may be selected and/or controlled via material property engine 560. Accordingly, the specifically identified mechanical, electrical, chemical parameters 561, 570, 577 do not necessarily define the full range of material properties which may be selected and/or controlled via material property engine 560.

It will be understood that in some examples the material distributor engine 510 and fluid dispenser engine 520 are not limited to specifying the types of materials, agents, etc. associated with parameters and engines (e.g. 512, 522, 524, 560, etc.) shown in FIG. 11, but instead may specify any type of material, agent, etc. conducive to additively manufacturing a 3D object, with such type of materials, agents, etc. depending on the size, type, shape, use, etc. of the 3D object, and depending on the particular type of method used to perform the additive manufacturing of the 3D object.

With respect to at least the various engines and functions (and their respective parameters) represented via at least blocks 510, 520, 530, 540, and 580 in FIG. 11, it will be understood that in at least some examples the various engines, functions, parameters may be arranged differently (e.g. in different groupings, combinations, separated, etc.) than shown in manufacturing engine 500 of FIG. 11 while still implementing the actions, arrangements, features, attributes, etc. as previously described in association with at least FIG. 11 and/or as described throughout at least some of the examples of the present disclosure.

It will be understood that various functions and parameters of manufacturing engine 500 may be operated interdependently and/or in coordination with each other, in at least some examples.

FIG. 12 is a flow diagram of an example method 700. In some examples, method 700 may be performed via at least some of the devices, components, material distributors, fluid supply, fluid dispenser, radiation sources, instructions, control portions, engines, functions, parameters, and/or methods, etc. as previously described in association with at least FIGS. 1-11. In some examples, method 700 may be performed via at least some of the devices, components, material distributors, fluid supply, fluid applicators, radiation sources, instructions, control portions, engines, functions, parameters, and/or methods, etc. other than those previously described in association with at least FIGS. 1-11.

As shown at 702 in FIG. 12, method 700 comprises arranging a material distributor to move relative to build pad to additively form a 3D object layer-by-layer via a build material. At 704 method 700 comprises arranging a fluid dispenser to dispense a first fluid agent, comprising a first color and a first material-property-changing ingredient, at first selectable voxel locations on at least some respective layers of a first portion of the 3D object. At 706, method 700 comprises arranging the fluid dispenser to dispense, at second selectable voxel locations on at least some respective layers of at least the first portion, a second fluid agent comprising a second color, and wherein the second color is selectable to at least partially disguise the first color on the first portion. In some examples, at least some of the second selectable voxel locations correspond to at least some of the first selectable voxel locations.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:
   a material distributor including a spreading element configured to spread a powder build material;
   a fluid ejection device including at least one of a thermal inkjet printhead and a piezoelectric inkjet printhead; and
   a control portion including a non-transitory medium to store machine readable instructions and a processing resource to execute the instructions to cause:
   via at least the spreader element of the material distributor, spreading the powder build material, layer-by-layer, to form a 3D object; and
   via the at least one of the thermal inkjet printhead and the piezoelectric inkjet printhead of the fluid ejection device, selectively ejecting onto at least some of the respective layers:
   a first fluid agent, comprising a first color, deposited at first selectable voxel locations in a first pattern to affect a first material property of a first portion of the 3D object; and
   a second fluid agent, comprising a second color, deposited at second selectable voxel locations in a second pattern to at least partially coextend with, and/or to fill-in open spaces between, at least some of the first selectable voxel locations of the first color to at least partially disguise the first material property and at least one of a shape, a size, and a distribution of the first pattern of the first color on at least one exposed layer of the at least some respective layers of the first portion of the 3D object such that information regarding a purpose, a function, an operation, an identification, a security, a structure, a manufacture, materials, or an effect of the 3D object is disguised.

2. The device of claim 1, wherein the instructions are to cause at least some of the second selectable voxel locations of the second pattern to correspond to at least some of the first selectable voxel locations of the first pattern.

3. The device of claim 1, wherein the instructions are to cause the selectively ejected, second fluid agent to comprise, in addition to the second color, ingredients to enhance fusing at the second selectable voxel locations without otherwise changing the first material property of the first portion in at least the second selectable voxel locations.

4. The device of claim 1, wherein the instructions are to cause the selectively ejected second color in the second pattern to be different from the first color.

5. The device of claim 4, wherein the instructions are to cause the selectively ejected, second color of the second pattern to comprise a plurality of different second colors.

6. The device of claim 5, wherein the instructions are to cause the selective ejecting of a respective one of the plurality of second colors at the selectable second voxel locations of the second pattern to be the same as a respective one of at least two different first colors of the first selectable voxel locations of the first pattern of at least some layers of the first portion of the 3D object, and
wherein the instructions are to cause the selectively ejected plurality of second colors in the second pattern to be arranged in a heterogeneous color pattern relative to the size, the shape, and/or the distribution of the at least two different first colors at the first selectable locations of the first pattern.

7. The device of claim 1, wherein the instructions are to cause the selectively ejected second color to be the same as one first color and the second color to be different from another first color associated with the first portion.

8. The device of claim 1, wherein the instructions to cause the selective ejecting of the first fluid agent to affect the first material property comprise instructions to cause the selective dispensing of the first fluid agent to affect at least one of:
a mechanical property of the first portion of the 3D object;
an electrical property of the first portion of the 3D object; and
a chemical property of the first portion of the 3D object.

9. The device of claim 1, wherein the instructions are to cause the second voxel locations of the second pattern of the second color to form a uniform pattern extending across the first pattern of the first color of the first portion of the 3D object.

10. The device of claim 9, wherein the second color comprises a single color.

11. The device of claim 9, when the instructions are to cause the selectively ejecting, via the fluid dispenser, of the second color of the second fluid agent in a second pattern to comprise a visibly uniform composite color producible via half-toning a plurality of second colors relative to the first color on the first portion.

12. The device of claim 1,
wherein the second pattern of second voxel locations comprises a size, a shape, and a distribution of the second color which is the same as the size, shape, and distribution of the first color of the first pattern of first voxel locations, and
wherein the second voxel locations of the second pattern fill-in the open spaces between the first voxel locations by interlineating the first voxel locations of the first pattern.

13. The device of claim 1, wherein the at least one of the thermal inkjet printhead and piezoelectric printhead of the fluid ejection device includes individually addressable nozzles to eject the respective first and second fluid agents as droplets.

* * * * *